United States Patent [19]

Bellanca

[11] Patent Number: 4,577,551
[45] Date of Patent: Mar. 25, 1986

[54] FETTUCCINE COOKING APPARATUS

[76] Inventor: Guido Bellanca, 220 E. 54th St., New York, N.Y. 10022

[21] Appl. No.: 674,767

[22] Filed: Nov. 26, 1984

[51] Int. Cl.$^4$ .......................... A47J 37/12; B01F 15/06
[52] U.S. Cl. ...................................... 99/348; 366/144; 366/219
[58] Field of Search .......................... 99/348, 485, 483; 366/144, 147, 148, 149, 219, 237, 239, 240

[56] References Cited

U.S. PATENT DOCUMENTS

| | | | |
|---|---|---|---|
| 3,688,684 | 9/1972 | Piedallu | 99/348 |
| 4,294,166 | 10/1981 | Takeuchi | 99/348 |
| 4,450,758 | 5/1984 | Belinkoff | 99/348 |
| 4,522,117 | 6/1985 | Weimer | 99/348 |
| 4,525,072 | 6/1985 | Giusti | 99/348 |

*Primary Examiner*—Robert W. Jenkins
*Attorney, Agent, or Firm*—Gipple & Hale

[57] ABSTRACT

A cooking apparatus which provides appropriate complex pan agitation for preparation of fettuccine or the like. A pan is mounted over a heat source in a stove frame on rollers mounted to opposite sides of the pan and received in elongated parallel tracks which extend at an angle to the horizontal. A handle extending from the pan engages a drive rod eccentrically mounted to a rotating crank wheel, so that the joint of the drive rod and the handle moves in a generally circular path. The pan is moved reciprocally along the tracks by the action of the drive rod, while passage of the junction of the drive rod and handle above or below the plane of the tracks causes the pan to pivot on the rollers received in the tracks. A heat control is provided for adjustment of the heat level provided to the pan from the heat source, and a speed control is provided for adjustment of the rate at which the crank wheel rotates to move the rod and pan.

9 Claims, 15 Drawing Figures

FETTUCCINE COOKING APPARATUS

BACKGROUND OF THE INVENTION

This invention relates generally to a cooking apparatus and, more specifically, to a cooking apparatus providing automatic complex motion of a saute pan at an adjustable rate for preparation of fettuccine or the like.

The application of sauce to pasta has long been considered a specialty skill in the art of food preparation. While the application process can be briefly described as exposure of a pan containing noodles and a sauce to heat during agitation of the pan, this only barely indicates the interrelationship of factors which can make the difference between, for instance, gourmet fettuccine and a discarded experiment. The formulation of the sauce is itself an important factor, and may incorporate a liquid dairy product ingredient such as cream, milk or melted butter which is especially sensitive to even momentary application of localized high heat. Thus one purpose of pan agitation is to circulate the sauce and take advantage of heat without permitting local burning and the radical alteration of flavor by dissolution of the combustion products in the sauce. Another purpose of agitation is to assure that the noodles are circulated through and coated evenly by the sauce at a rate appropriate to achievement of the coating consistency desired by those consumers with an educated taste for fettuccine.

In the prior art, the process of agitation for noodle circulation and coating and avoidance of sauce burns has been conducted by hand. Those who possess the physical strength and concentration necessary for pan agitation over an extended period of time, and the visual and taste skills necessary to determine the on-going status of the preparation process, have been considered very valuable specialists and are paid accordingly. Thus the end product of the process has also been considered a delicacy, and the restaurant industry has long recognized that customers pay generously for a fine product of a skilled fettuccine chef. It can readily be appreciated, therefore, that it has heretofore been considered impossible to automate the process of agitation of a sauce pan containing noodles and sauce over heat in order to produce a gourmet-quality product. At the same time, it can be seen that such a system would be highly useful and find ready acceptance in the market place, by making fine fettuccine available in larger quantities, and freeing the attention of the skilled chef for other matters in a restaurant kitchen. It remains clear, therefor, that the prior art fails to provide an automated mechanism for pan agitation which provides a complex pan motion sufficient to circulate noodles and sauce and with adjustments sufficient to permit consistent application of sauce to noodles at the desired rate and amount.

SUMMARY OF THE INVENTION

The present invention comprises an apparatus for automatic application of complex motion to a saute pan at an adjustable rate while the pan is exposed to an adjustable heat. The apparatus in its presently preferred form comprises a stove frame, a drive train and a heat source mounted in the stove frame, pan support tracks mounted above said heat source to support a pan, and a pan incorporating free wheel rollers mounted on the exterior of the pan and positioned to be received in and moved along the pan support track, together with a pan handle which engages the drive train so that the pan is both reciprocated along the tracks and pivoted about the pan rollers above and below the plane of the tracks. The drive train comprises a motor, a crankshaft driven by the motor, a crank wheel mounted to the crankshaft, and an eccentric rod mounted to the crank wheel. The end of the rod remote from the crank wheel releasably engages the end of the pan handle remote from the pan. The rod is driven by the crank wheel to move in a vertical plane containing the pan handle. The motor may be a DC electric motor, and a motor control such as a potentiometer coupled to the DC power supply for the motor may be utilized to adjust the rate at which the pan is moved by the rod. The heat source over which the pan is suspended may be any well-known conventional cooking heat source such as a gas burner, with a heat source control such as a gas valve in the gas supply line to vary the amount of gas reaching the burner.

The operation of the present invention provides uniform, repeatable motion of a saute pan at a rate selectable by the user. Thus, for a given formulation and amount of sauce combined with a given amount of noodles, this invention provides uniform, repeatable preparation results without the need for constant or even intermittent attention by a chef of great skill. The chef need only provide adjustments of the system until the desired product is achieved, and thereafter only an operator of lesser skill is required to start and stop the system and to unload and reload the pan.

These and other objects and advantages of the invention will be made more readily apparent by review of the following detailed description of a presently preferred embodiment thereof, when taken together with the accompanying drawings.

DETAILED DESCRIPTION OF THE DRAWINGS

Figures 1, 2, 3:
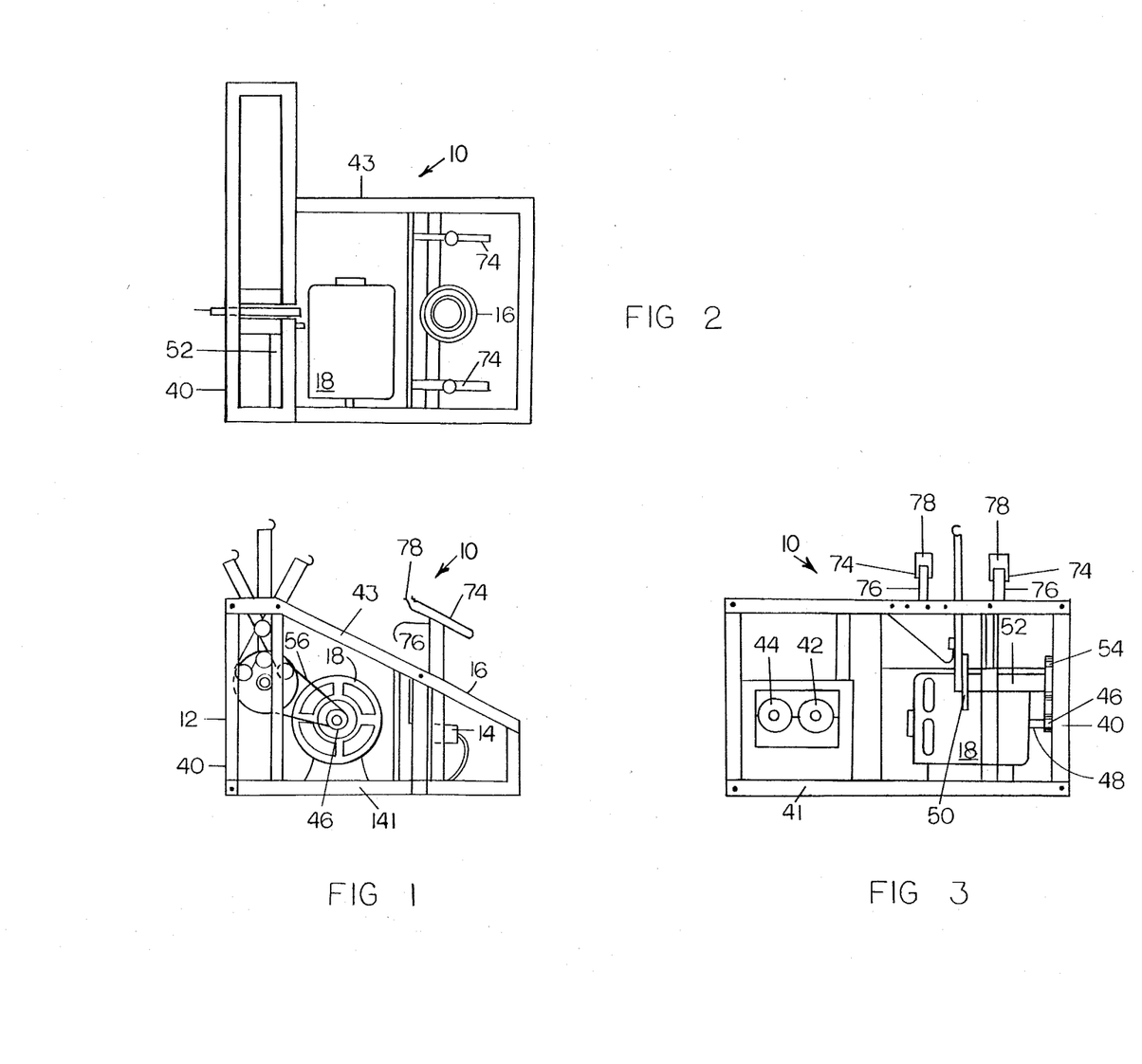
FIG. 1 is a side view of an apparatus according to the present invention.
FIG. 2 is a top plan view of the apparatus of FIG. 1.
FIG. 3 is a front view of the apparatus of FIG. 1.

The best mode and presently preferred embodiment of the present invention is most clearly shown in FIGS. 1–3. A cooking machine according to the present invention is generally indicated at 10 and comprises a stove 12 incorporating a heat source 14, a chimney 16, and an agitation motor 18. A pan 20 is mounted over chimney 16 for exposure to heat from heat source 14, and is agitated in a complex reciprocating motion by action of motor 18 as will be set forth in greater detail below. Chimney 16 is adapted to direct heat from heat source 14 upward to a pan. Heat source 14 may be any well-known conventional cooking heat source such as a gas burner. Motor 18 is preferably a DC electric motor.

Figure 4:
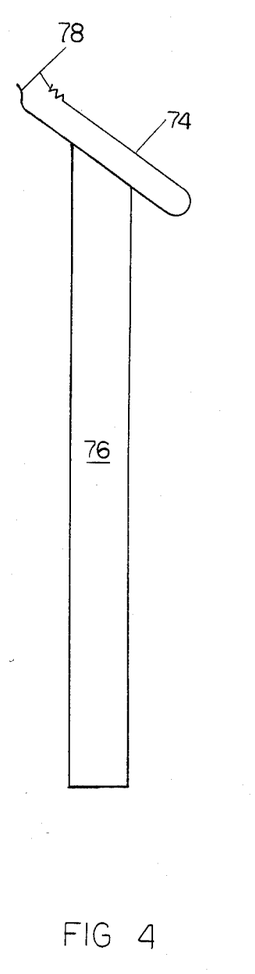
FIG. 4 is an isolated enlarged view of a portion of the apparatus of FIG. 1.

As best seen in FIGS. 1 through 3, the stove 12 comprises a stove frame 40 in which heat source 14 and motor 18 are mounted. The base 41 of frame 40 is horizontal, and upper surface 43 of frame 40 lies in a plane which preferably intersects the horizontal at an angle of 30 degrees. Pan supports 76 extend vertically above upper surface 43 on opposite sides of chimney 16. As most clearly shown in FIG. 4, secured atop each pan support 76 is a pan roller track 74 adapted to receive, through the open ends 78 of each track 74, a roller 24 mounted to and extending from either side of pan 20, thereby to support pan 20 above chimney 16 and permit reciprocal motion of pan 20 over chimney 16. Track 74 lies in a plane also at an angle to the horizontal, also preferably 30 degrees.

Figure 5:
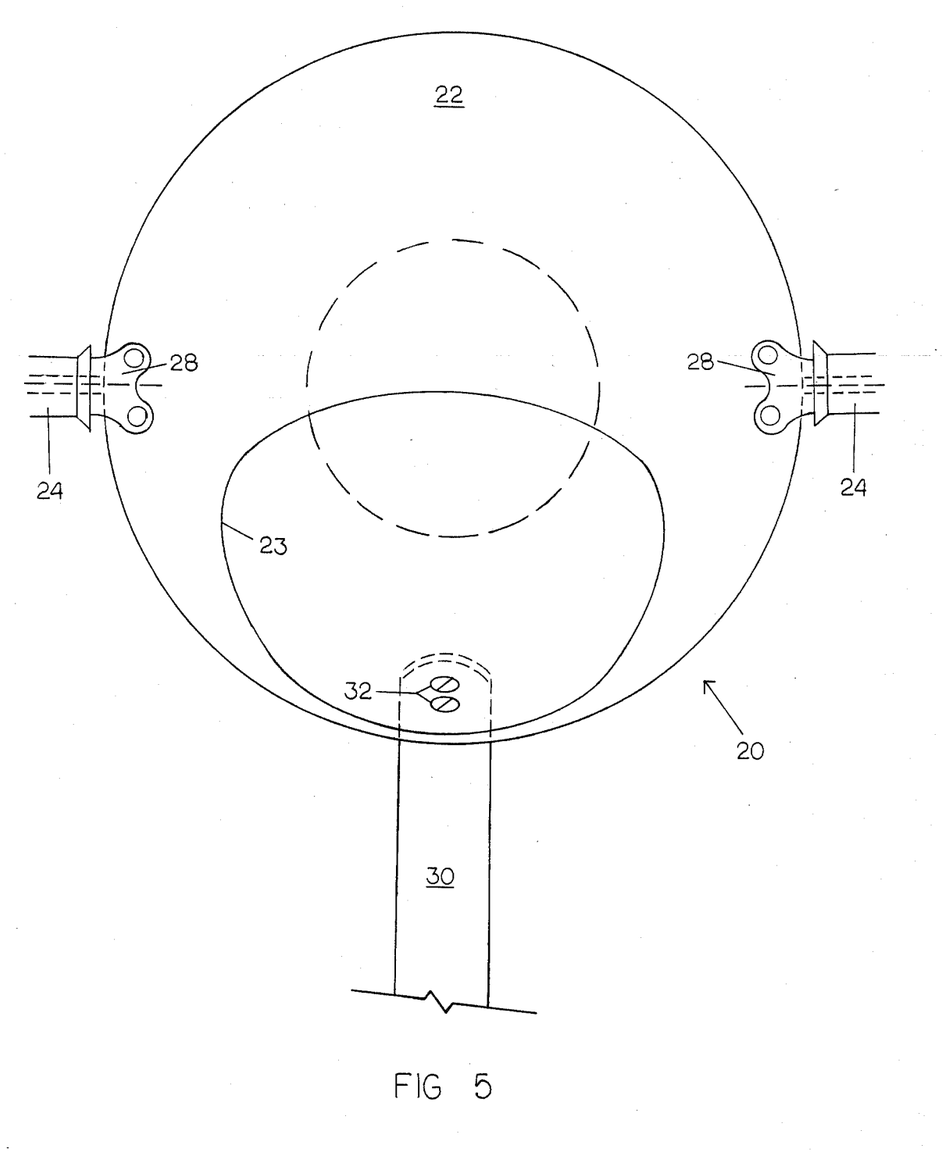
FIG. 5 is a top plan view of a sauce pan usable in the apparatus of FIG. 1.
Figure 6:
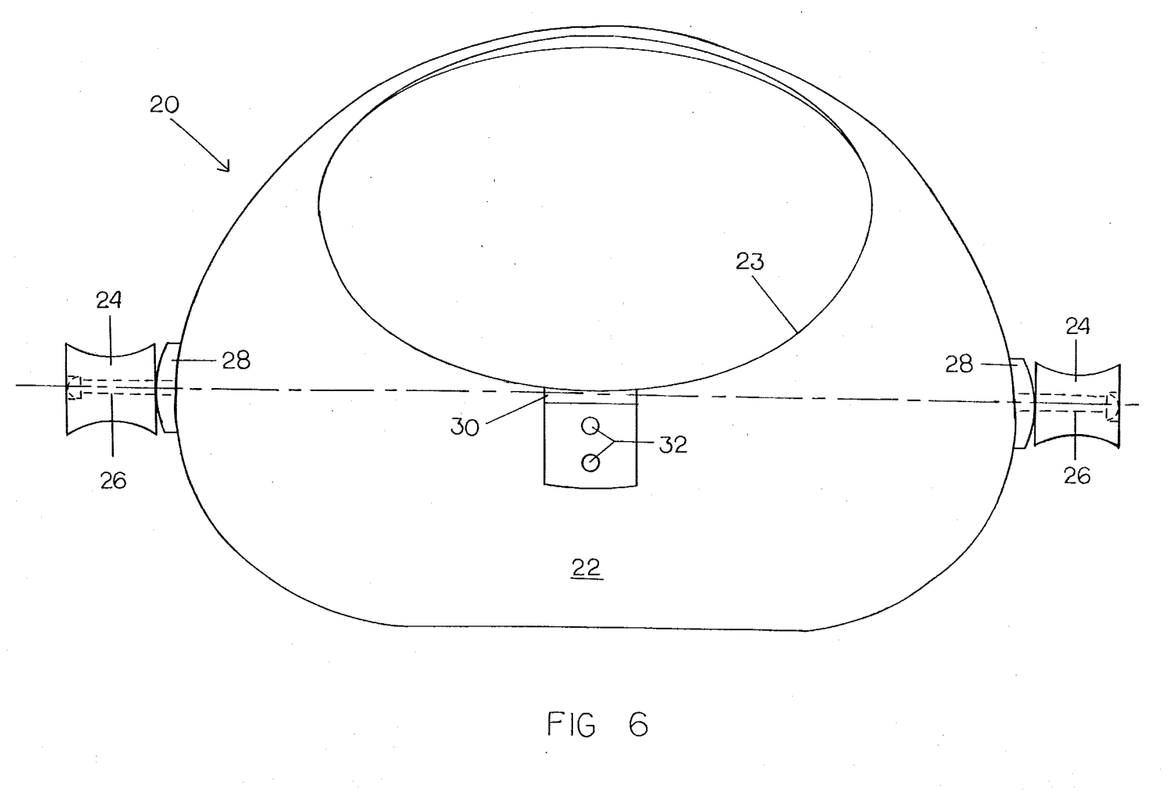
FIG. 6 is a front view of the sauce pan of FIG. 5.
Figure 7:
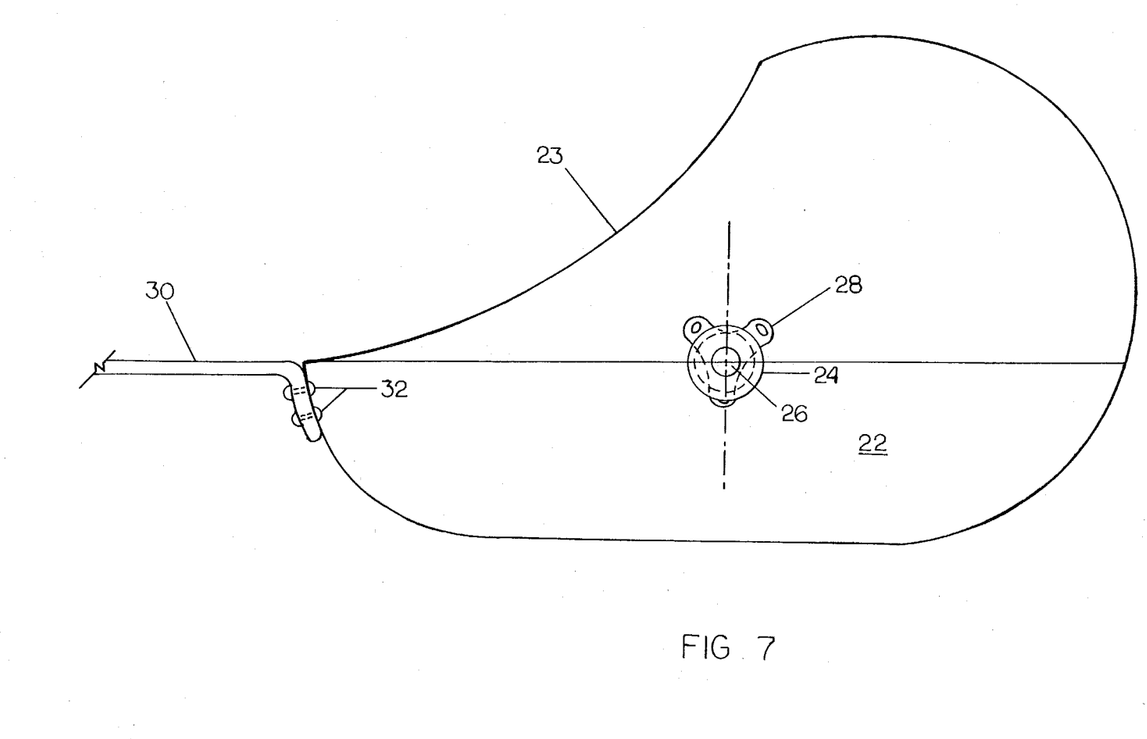
FIG. 7 is a side view of the sauce pan of FIG. 5.
Figure 8:
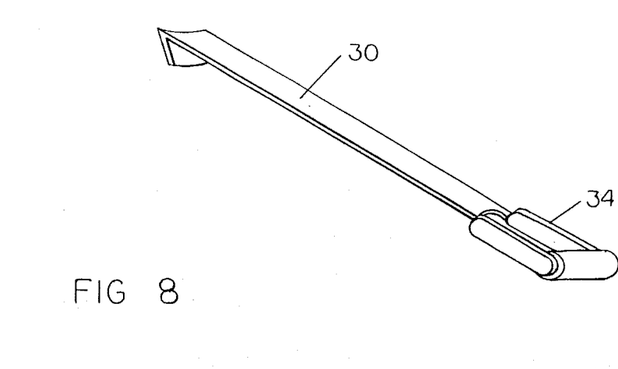
FIG. 8 is an isolated perspective view of the handle of the sauce pan of FIG. 5.
Figure 9:
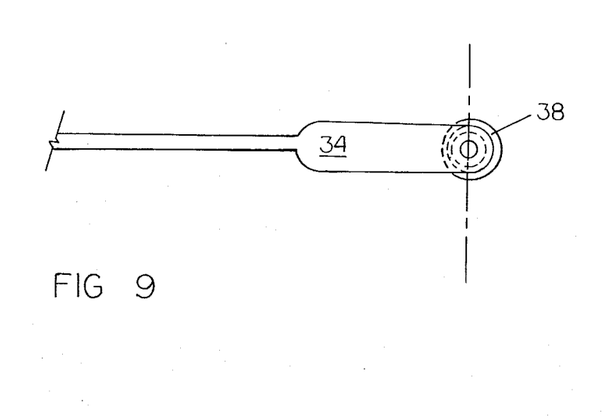
FIG. 9 is a side view of the handle of FIG. 8.
Figure 10:
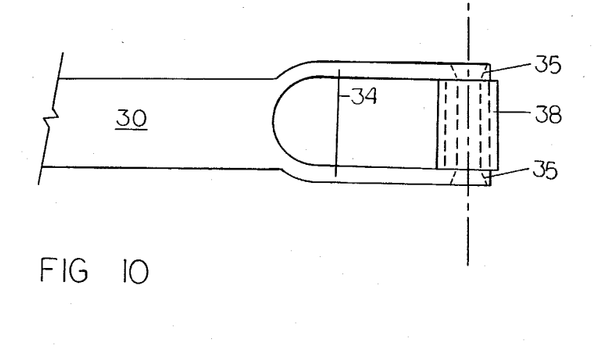
FIG. 10 is an isolated top plan view of a portion of the handle of FIG. 8.
Figure 11:
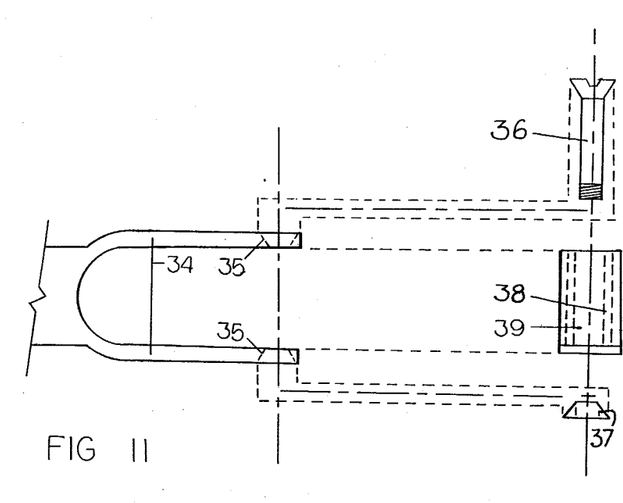
FIG. 11 is an exploded view of the handle portion of FIG. 10.

Turning now to FIGS. 5 through 7, it can be seen that the pan 20 comprises a pan body 22 having pan rollers 24 mounted to and extending from opposite sies of pan body 22 for reception by pan roller tracks 74. Each roller 24 is mounted for freewheel action on roller axle 26, which is in turn mounted in any well-known conventional manner to axle mounts 28 fixed to pan body 22 so that each axle 26 extends outward from pan body 22 along a common axis. A pan handle 30 extends away from body 22 and is mounted to body 22 by any well-known conventional means such as pan rivets 32. The major axis of pan handle 30 preferably lies along the major axis of the pan body 22 perpendicular to the common axis of rollers 24. The pan body 22 may be manufactured of any well-known conventional material used for saute pans, such as copper or aluminum. The opening 23 of pan body 22 is preferably oriented so as to substantially comprise the uppermost edge of pan body 22 when pan handle 30 is lifted to an angle of about 30 degrees from horizontal.

Turning now to FIGS. 8 through 11, it can be seen that the end of pan handle 30 remote from pan body 22 terminates in a U-shaped bracket 34. Mounted to bracket 34 for freewheel action is a cylindrical pin 38, which is preferably rubber coated to maximize surface friction for purposes to be clarified below. The pin 38 may be mounted to the bracket 34 by the well-known conventional method of countersinking throughgoing bores 35 in opposite sides of bracket 34, and securing a bolt 36 and nut 37 through the bores 35 and throughgoing pin bore 39 of pin 38.

Returning now to FIGS. 1 through 3, it can be seen that a motor axle 48 of motor 18 has mounted thereon a motor wheel 46 which is driven to rotate by motor 18. Rotatably mounted to a portion of stove frame 40 adjacent to motor 18 is crankshaft 52 which is parallel to the axle 48. A crank wheel 50 is fixedly mounted to shaft 52, and a drive wheel 54 is fixedly mounted to shaft 52 also. An endless motor belt 56 encircles drive wheel 54 and motor wheel 46 so that operation of motor 18 will rotate shaft 52 and wheel 50.

Figures 12, 13:
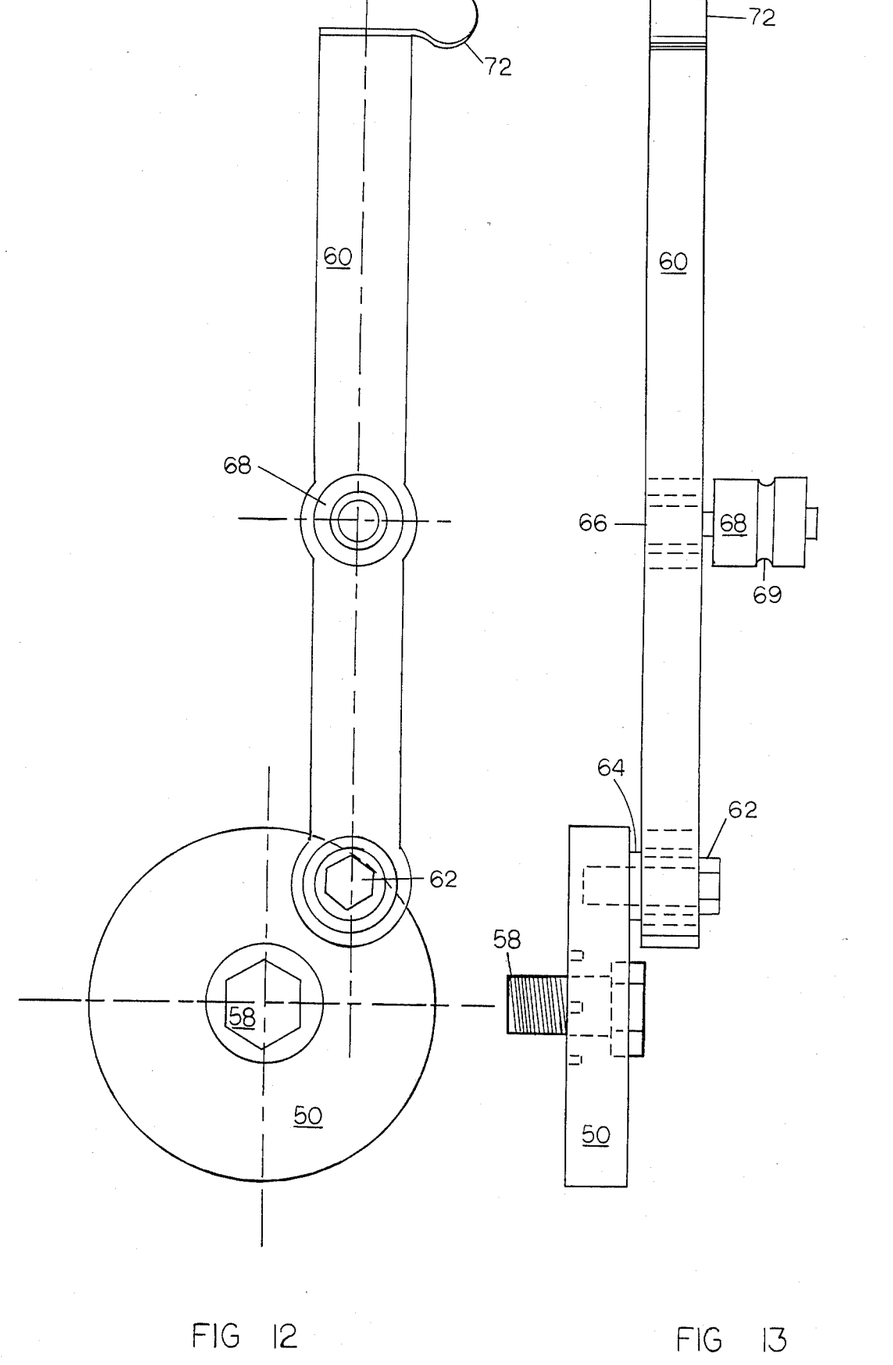
FIG. 12 is an isolated side view of the crank wheel and eccentric rod of the apparatus of FIG. 1.
FIG. 13 is a back view of the crank wheel and eccentric rod of FIG. 12.
Figure 14:
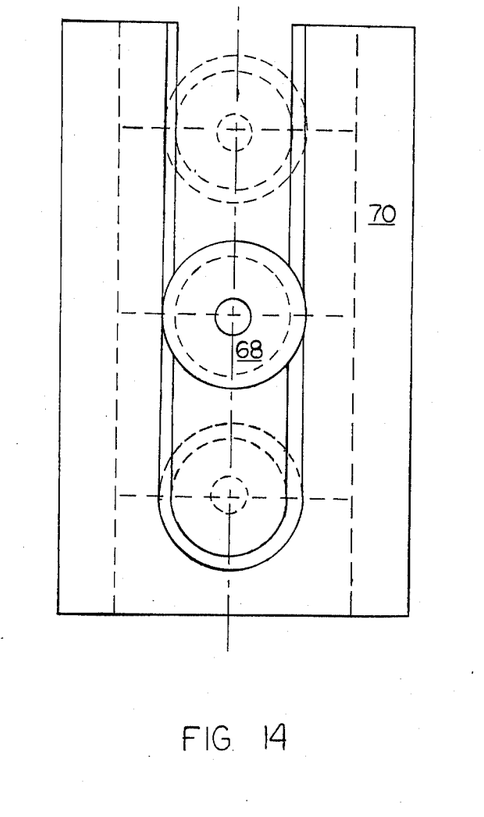
FIG. 14 is an enlarged isolated view of the slide roller and slide roller bracket of the apparatus of FIG. 1.

Wheel 50 may be mounted to shaft 52 for rotation in any well-known conventional manner. For instance, as shown in FIGS. 12 through 14, a bolt 58 which bears a threaded surface in opposition to the direction of rotation of wheel 50 may be countersunk through the center of wheel 50. The bolt and wheel may then be installed by threaded engagement of the bolt 58 with an axial blind bore (not shown) defined at an end of shaft 52 and having threads corresponding to those of bolt 58.

Drive rod 60, as seen in FIGS. 12 through 14, is eccentrically mounted to wheel 50 at some distance from the center of wheel 50. Any well-known conventional bearing 62, such as sealed bearing, may be utilized for this purpose. Placed between rod 60 and wheel 50 is a spacing washer 64 of sufficient thickness so that the surface of rod 60 will not contact bolt 58 during rotation of wheel 50.

Figure 15:
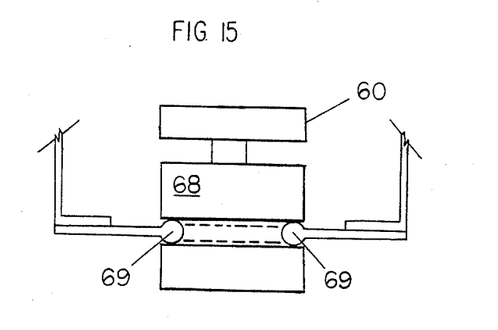
FIG. 15 is a top plan view of the slide roller and slide roller bracket shown in FIG. 14.

At an end of rod 60 opposite the bearing 62, a semicircular rod hook 72 is mounted which is sized for releasable engagement with pin 38 at the end of pan handle 30. Between hook 72 and bearing 62, a slotted slide roller 68 extends from rod 60 parallel to crankshaft 52, and is mounted for freewheel action on slide roller bearing 66 mounted to rod 60. The slide roller bearing 66 is preferably a sealed bearing. As best seen in FIGS. 14 and 15, the circumferential slot 69 of slide roller 68 engages a U-shaped slide roller track 70 mounted to stove frame 40 so that the track 70 permits vertical motion of roller 68 and prohibits horizontal motion of roller 58. Thus as rotation of wheel 50 carries bearing 62 to opposite sides of shaft 52, the rod 60 pivots on slide roller 68 and slide roller bearing 66 causing the rod hook 72 to carry the pin 38 and handle 30 in a closed, generally circular path above stove 12.

In operation of the present invention, an empty pan 20 is initially placed above chimney 16 by passing pan rollers 24 between open ends 78 of pan roller tracks 74. The pin 38 of handle 30 is then clipped into the rod hook 72, which is preferably made of any thin-gauge resilient metal, by looping bracket 34 around hook 72 and pulling on handle 30 so that pin 38 presses against and snaps through the open portion of hook 72. The ingredients to be sauteed are then placed in the pan through opening 23. Motor control 44, such as a potentiometer coupled to motor 18, is then adjusted for a desired speed of motion of the rod 16 and pan 20. As the rod 60 carries the pin 38 in a closed, generally circular path, the pan rollers 24 move along the length of roller tracks 74. Where the path of rod hook 72 passes above or below the plane of the pan roller tracks 74, the pan body 22 simultaneously rotates about the coaxial pan rollers 24. Thus the pan body 22 follows a complex motion pattern above chimney 16 which is especially well-suited for automatic unattended saute of fettuccine noodles or similar sauce-coating pastas or procedures. The heat control or gas valve 42 which is coupled to heat source 14, is then adjusted to provide an appropriate degree of heat desired for cooking. The apparatus is allowed to apply heat and motion to pan body 22 until such time as the ingredients reach the desired stage of consistency, at which point the heat control 42 is adjusted to terminate heat from heat source 14, and motor control 44 is adjusted to stop motor 18. The rod hook 72 is then disengaged from pin 38 of handle 30, by pushing handle 30 toward the open portion of hook 72 until pin 38 snaps out of hook 72. The handle 30 may then be grasped and pulled so that pan rollers 24 move along tracks 74 and pass out of tracks 74 between ends 78.

Thus it can be appreciated that the present invention provides the necessary action for preparation of fettuccine or the like with a high degree of uniformity and repeatability. The apparatus can be adjusted until an optimum result is attained, and then be operated unattended.

In the foregoing description, the invention has been described with reference to a particular preferred embodiment, although it is to be understood that the specific details shown are merely illustrative and that the invention may be carried out in other ways without departing from the true spirit and scope of the following claims.

What is claimed is:

1. A cooking machine for preparation of fettuccine or the like, comprising in combination: a stove frame, a heat source mounted to said stove frame, a plurality of pan supports mounted to said stove frame, said pan supports each defining open-ended track means extending along an angle to the horizontal and adapted to receive and confine movement of a pan roller within said track means, a pan comprising a pan body, a handle secured to said pan body and a plurality of pan rollers each corresponding to one of said pan supports, each of said pan rollers of said pan being adapted to enter and move along said track means, said pan rollers being coaxial and adapted to allow said pan body to pivot on an axis through said rollers, and drive train means adapted to engage said handle of said pan and to move said handle of said pan in a closed vertical loop so as to reciprocate said pan along the length of said pan supports while pivoting said pan on the axis defined by said pan rollers.

2. A cooking machine for preparation of fettuccine or the like, comprising in combination: a stove frame, a heat source mounted to said stove frame, a chimney mounted to said frame above said heat source, a plurality of pan supports mounted to said stove frame above said heat source, and extending thereabove surrounding said chimney, said pan supports each defining elongated open-ended track means adapted to receive and confine movement of a pan roller within said track means, said track means defining a plane at an angle to the horizontal, a pan comprising a pan body, a handle, and a plurality of pan rollers each corresponding to one of said pan supports, each of said pan rollers of said pan being adapted to enter and move along said track means, said pan rollers being coaxial and adapted to allow said pan body to pivot on an axis through said rollers, and drive train means adapted to engage said handle of said pan and to move said handle of said pan in a closed, generally circular path so as to reciprocate said pan along the length of said pan supports while pivoting said pan on the axis defined by said pan rollers, said heat source being adapted to pass heat through said chimney and said chimney being adapted to direct said heat to said pan.

3. An apparatus as claimed in claim 2, wherein said pan body defines a pan opening at a portion of said pan body which is uppermost when said handle is engaged with said drive train and said pan rollers are received in said pan support.

4. An apparatus as claimed in claim 2, wherein said pan support tracks defines a plane having an angle of 30 degrees to the horizontal.

5. An apparatus as claimed in claim 2, wherein said drive train comprises, in combination: a motor, a rotatable crank wheel coupled to said motor and driven by said motor to rotate, a drive rod mounted eccentrically to said crank wheel at one end of said drive rod, hook means fixedly coupled to a second end of said drive rod and adapted to releasably engage said handle of said pan, a slide roller rotatably mounted to said drive rod between said crank wheel and said hook means parallel to the axis of rotation of said crank wheel, and a slide roller track fixedly mounted to said stove frame and adapted to receive said slide roller and permit vertical motion of said slide roller and prohibit horizontal motion of said slide roller, so that said hook is driven by rotation of said crank wheel in said closed, generally circular path.

6. An apparatus as claimed in claim 5, wherein said motor further comprises a motor axle, and said drive train further comprises a motor wheel mounted to said motor axle for rotation of said motor wheel, a crank shaft rotatably mounted to said stove frame parallel to said motor shaft, said crank wheel being mounted to said crankshaft for rotation by said crankshaft, a drive wheel mounted to said crankshaft, and an endless motor belt encircling said drive wheel and said motor wheel, so that said motor rotates said motor axle, said motor wheel, said motor belt, said drive wheel, said crankshaft and said crank wheel.

7. An apparatus as claimed in claim 2, further comprising heat control means operatively connected to said heat source means and adapted to control the amount of heat delivered by said heat source means through said chimney to said pan.

8. An apparatus as claimed in claim 2, further comprising motor control means mounted to said stove frame and operatively connected to said motor means, said motor control means being adapted to control rotation speed of said motor.

9. A cooking machine for preparation of a pasta coated with a sauce comprising in combination: a stove frame, a heat source mounted to said stove frame, a pan comprising a pan body, a handle, and a plurality of freewheel pan rollers, said pan rollers having a common axis on which said pan body is pivotable, a plurality of pan supports mounted to said stove frame and extending over said heat source, said pan supports each defining track means adapted to receive and confine movement of a corresponding one of said pan rollers within said track means along a path at an angle to the horizontal, and drive train means adapted to engage and move said handle to said pan so as to reciprocate said pan along said pan supports while pivoting said pan on said common axis of said pan rollers, said heat source being adapted to apply heat to said pan, said drive train means comprising a motor, a rotatable crank wheel coupled to said motor and driven by said motor, a drive rod mounted eccentrically to said crank wheel, hook means coupled to said drive rod and adapted to releaseably engage said handle of said pan, a slide roller rotatably mounted to said drive rod between said crank wheel and said hook means and defining a circumferential slot, and a vertical slide roller track mounted to said stove frame and adapted to receive said slot of said slide roller.

* * * * *